US006664674B2

(12) United States Patent
Ihata

(10) Patent No.: US 6,664,674 B2
(45) Date of Patent: Dec. 16, 2003

(54) COOLING STRUCTURE OF VEHICLE AC GENERATOR

(75) Inventor: Koichi Ihata, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/827,214

(22) Filed: Apr. 6, 2001

(65) Prior Publication Data

US 2001/0030472 A1 Oct. 18, 2001

(30) Foreign Application Priority Data

Apr. 14, 2000 (JP) ........................................ 2000-113967

(51) Int. Cl.[7] .................................................. H02K 1/32
(52) U.S. Cl. ...................................... 310/64; 310/68 D
(58) Field of Search ................................ 310/64, 67 R, 310/68 R, 71, 68 D, 263, 52, 53, 58, 60 R, 63

(56) References Cited

U.S. PATENT DOCUMENTS

| 4,103,193 | A | * | 7/1978 | Ito ............................ 310/68 D |
| 4,419,597 | A | * | 12/1983 | Shiga et al. ............... 310/68 D |
| 4,926,076 | A | * | 5/1990 | Nimura et al. ................ 310/58 |
| 5,093,591 | A | * | 3/1992 | Kitamura et al. ............ 310/52 |
| 5,677,616 | A | * | 10/1997 | Ooiwa ....................... 310/68 R |
| 5,686,780 | A | * | 11/1997 | Adachi et al. ............... 310/239 |
| 5,998,891 | A | | 12/1999 | Chen et al. ................. 310/68 R |
| 6,060,802 | A | | 5/2000 | Masegi et al. ............ 310/68 D |
| 6,198,187 | B1 | * | 3/2001 | Asao et al. ................ 310/68 D |
| 6,426,575 | B1 | * | 7/2002 | Masegi et al. ............ 310/68 D |

FOREIGN PATENT DOCUMENTS

| DE | 4131966 | 4/1992 |
| EP | 0 300 063 | 1/1989 |
| JP | 56019353 | 2/1981 |
| JP | 06046547 | 7/1992 |
| JP | 06113505 | 9/1992 |
| JP | A-7-274440 | 10/1995 |
| JP | 09172752 | 6/1997 |
| JP | 62-144551 | 6/1997 |
| JP | 11164518 | 6/1999 |
| JP | P-2000-166178 | 6/2000 |

* cited by examiner

Primary Examiner—Dang Le
(74) Attorney, Agent, or Firm—Oliff & Berridge, PLC

(57) ABSTRACT

A vehicle AC generator includes a rotor, a stator, a frame supporting the rotor and the stator, a rear cover having an air intake window, a rectifying unit including a pair of cooling fins and a plurality rectifier elements, a brush unit including a pair of brushes and a brush-holder, a connector case having a terminal for transmitting and receiving electric signals and an IC regulator. The pair of cooling fins has a common cutout section forming an accommodation space between the frame and rear cover, and the connector case is disposed in the accommodation space so as to form a cooling air passage connecting the air intake window around the connector case. The IC regulator is disposed in the cooling air passage to face the rear cover so that the heatsink is disposed opposite the air intake window. Therefore, the IC regulator is cooled effectively and direct heat radiation on the IC regulator from the cooling fins and the brush holder is prevented.

13 Claims, 4 Drawing Sheets

COOLING STRUCTURE OF VEHICLE AC GENERATOR

CROSS REFERENCE TO RELATED APPLICATION

The present application is based on and claims priority from Japanese Patent Application 2000-113967, filed Apr. 14, 2000, the contents of which are incorporated herein by reference.

BACKGROUND OF THE INVENTION

1. Field of the Invention

The invention relates to a vehicle AC generator that is driven by an engine of a vehicle, such as a passenger car or a truck.

2. Description of the Related Art

In these days, the engine compartment of vehicles has become narrower as vehicles have adopted slant nose styles in order to reduce vehicle's running resistance and, also, to satisfy demands for wider passenger compartment. Accordingly, the space in the engine compartment for mounting an AC generator has become narrower.

Rotation speed of vehicle AC generators has been lowered because engine speed is lowered to improve fuel consumption of vehicles. On the other hand, the output power of AC generators has increased in order to satisfy the demand for increasing electric power to be supplied to various electric devices such as safety control devices. Thus, the demand for small, powerful and inexpensive vehicle AC generators have been increased.

The output power of an AC generator can be increased if winding resistance of a rotor is reduced. However, if the winding resistance is reduced, field current to be controlled by an IC regulator increases, resulting in temperature rise of the IC regulator. This necessitates more cooling of the IC regulator within a limited space in order to ensure the reliability of the IC regulator.

U.S. Pat. No. 6,060,802 or its corresponding Japanese Application, JP-A-11-164518, discloses an IC regulator that is disposed between a brush holder and a connector. An axial cooling air passage is formed along a heatsink of the IC regulator to cool the IC regulator.

Because the IC regulator of the above prior art is disposed opposite the brush holder, heat generated by electric current flowing in the brushes and by friction between the brushes and slip rings is transmitted to the brush holder. As a result, the heat is radiated from the brush holder to the IC regulator. The IC regulator also has a surface that directly faces the heat sink of the voltage regulator from which heat radiates.

Under a certain circumstance, temperature of the brush holder and the cooling fins of the rectifier may rise by 100° C. or more, and temperature of the IC regulator may rise by 60° C., although the temperature rise of the IC regulator by itself is 30° C.

It is possible to reduce such temperature rise caused by the heat radiation if the IC regulator is disposed remote from the brush holder and the rectifier's cooling fin. However, the rear portion of the AC generator becomes too large to be mounted in a limited space of a vehicle.

SUMMARY OF THE INVENTION

Therefore, a main object of the invention is to provide a vehicle AC generator in which an IC regulator is effectively cooled without increasing the size of the AC generator or sacrificing cooling performance of other parts with the IC regulator being disposed in a limited space.

According to a main feature of the invention, an AC generator for a vehicle includes a rotor having a field coil, a stator having an armature coil, a frame for supporting the rotor and stator, a rear cover having an air intake window, a pair of cooling fins having a common cutout section thereby forming an accommodation space between the frame and the rear cover, a plurality of positive and negative rectifier elements respectively fixed to the pair of cooling fins, a brush-holder disposed in the accommodation space to hold a pair of brushes, a connector case disposed in the accommodation space radially outside the brush holder so as to form a cooling air passage connecting the air intake passage around the connector case and an IC regulator disposed in the cooling air passage around the connector case to face the rear cover. In addition, the IC regulator has a heatsink disposed opposite the air intake window of the rear cover.

Therefore, direct heat radiation from the cooling fins and the brush holder is interrupted by the connector case, thereby controlling temperature rise of the IC regulator.

The heatsink of the IC regulator may be disposed at a radially outside portion of the connector case.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
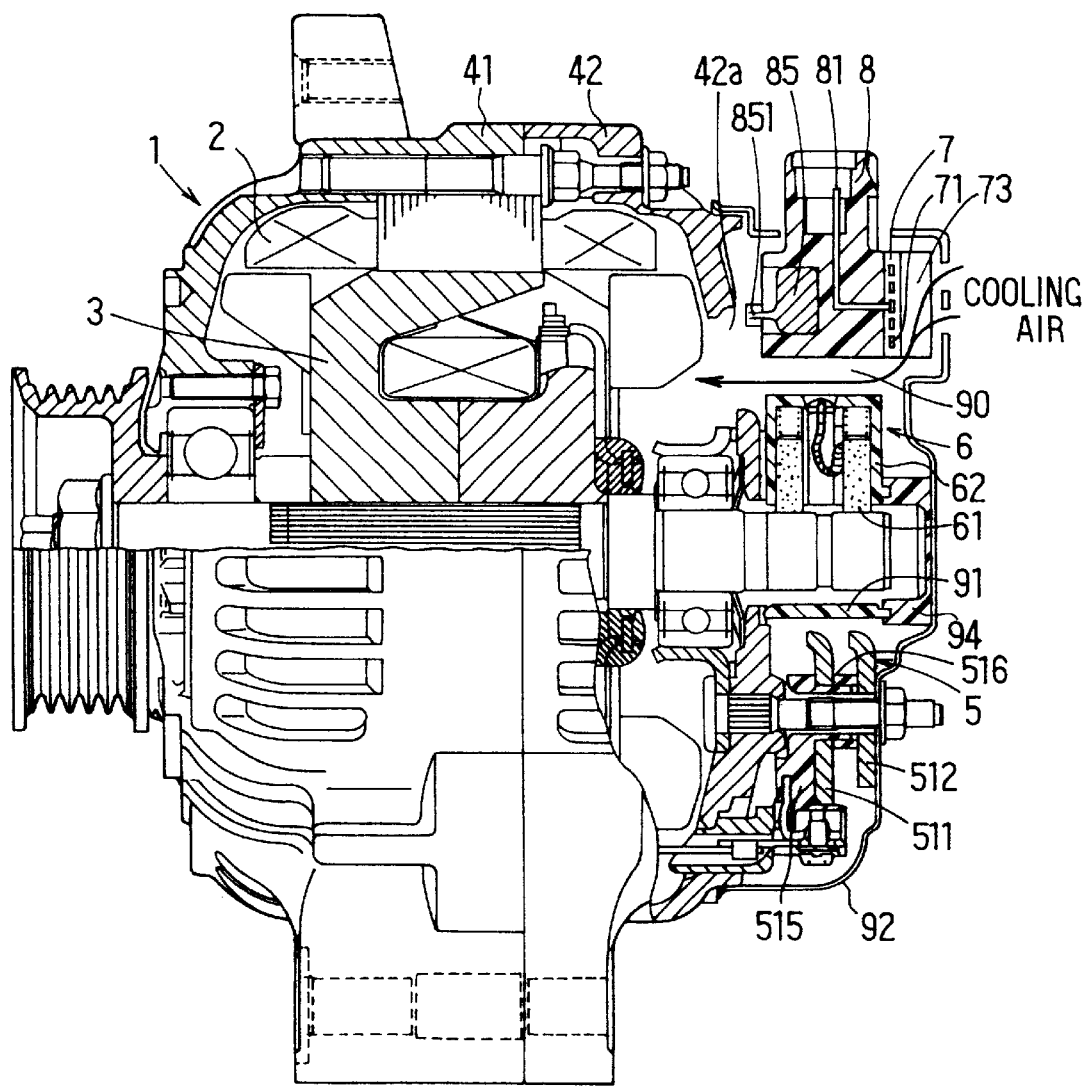
FIG. 1 is a cross-sectional side view illustrating a vehicle AC generator according to a first embodiment.
Figure 2:
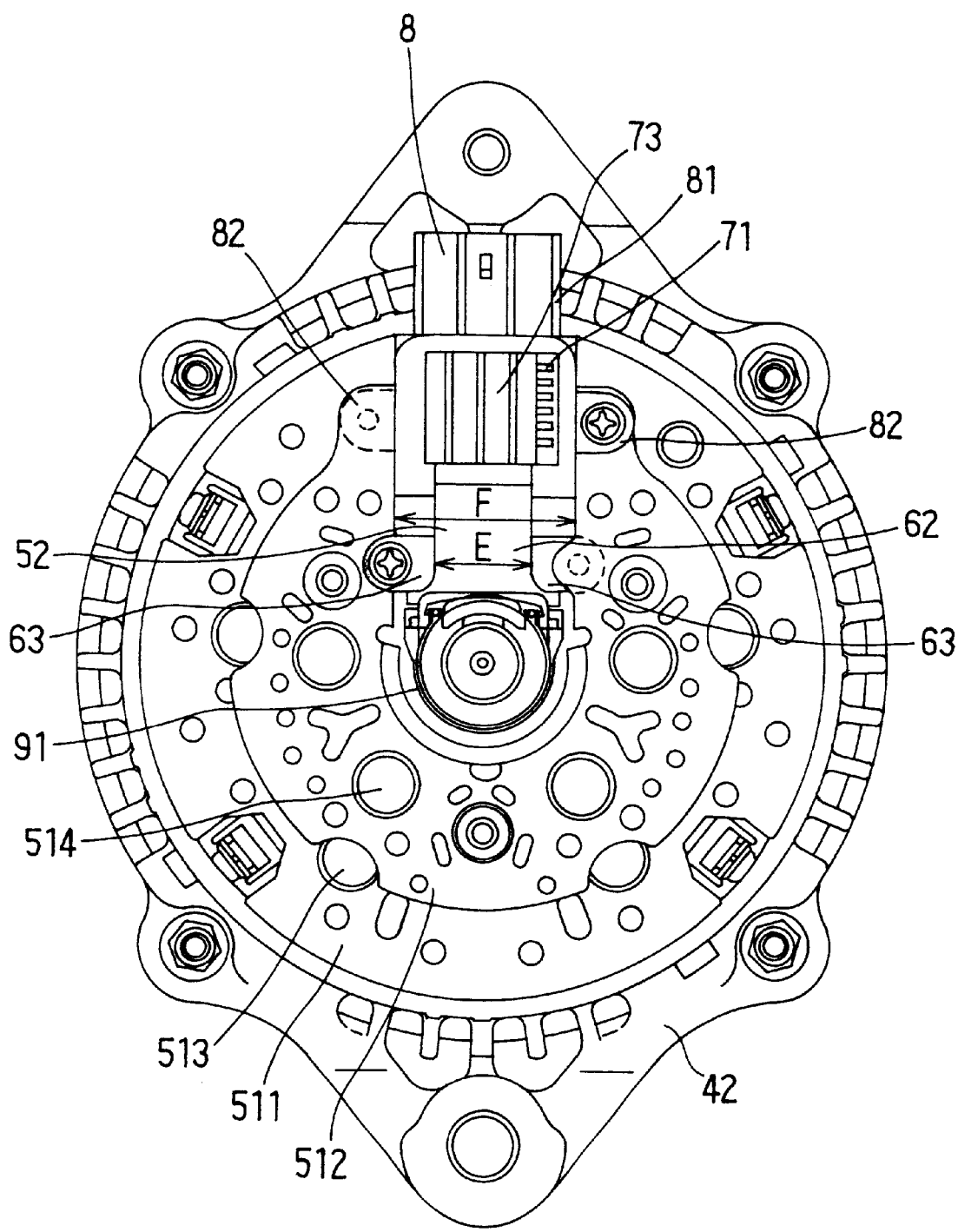
FIG. 2 is a rear view of the vehicle AC generator illustrated in FIG. 1 without a rear cover and a sealing ring.
Figure 3:
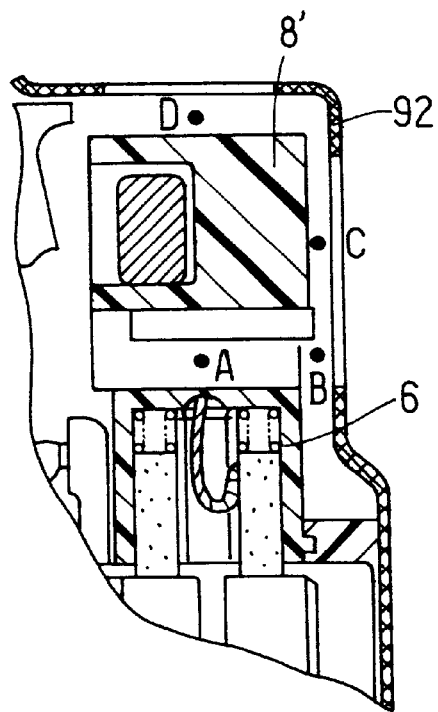
FIG. 3 is a fragmentary enlarged cross-sectional view of a portion around an IC regulator of the vehicle AC generator illustrated in FIG. 1.

A vehicle AC generator according to a first embodiment of the invention is described with reference to FIGS. 1–4.

The vehicle AC generator 1 is comprised of a stator 2, a rotor 3, a pair of front and rear frames 41 and 42, a rectifier unit 5, a brush holder 6, an IC regulator 7, a connector case 8, a rear cover 92, etc. The stator 2 functions as an armature, and the rotor functions as a magnetic field. The pair of frames 41 and 42 jointly supports the stator 2 and the rotor 3 so that the stator 2 and the rotor 3 can cooperate to generate AC power. The rectifier unit converts the AC power to DC power, and the IC regulator 7 controls the output voltage of the DC power. The brush holder 6 holds a pair of brushes 61 to supply field current to the rotor 3. The connector case 8 has a terminal for communicating electric signals with a control unit of a vehicle disposed outside the AC generator.

The rectifier unit 5 is comprised of a pair of positive cooling fin 511 and a negative cooling fin 513, positive diodes 512, negative diodes 514, a terminal unit 515, sleeves 516, etc. The pair of cooling fins 511 and 513 overlaps each other in the axial direction of the generator. The terminal unit 515 is comprised of a resinous insulating member that insulates the positive cooling fin 511 and the negative cooling in 512 from each other. The terminal unit also provides a circuit member for forming the plurality of diodes 513 and 514 into a full-wave bridge circuit for rectifying AC power.

The pair of cooling fins 511 and 512 has a common cutout section 52 at the middle thereof. Each cooling fin is made of a C-shaped heat conductive metal member that has the cutout section 52 at the middle thereof. The cutout section 52 has parallel sides spaced apart from each other at a distance F. The distance F is 1.3–3 times or, more preferably, 1.8–2.3 times as long as a width E of a brush case 62, which is described in detail later. The pair of cooling fins 511 and 512 is fixed to the rear frame 42 via the terminal unit 515 and the sleeves 516 by bolts. The brush holder 6, IC regulator 7 and the connector 8 are disposed inside the cutout section 52.

The plurality of diodes 513 and the plurality of diodes 514 are respectively fixed to the cooling fins 511 and 512 by soldering or press-fitting. A seal ring 94 is disposed at the center of the rear cover 92, and a slip ring protector 91 is disposed between the seal ring 94 and the rear frame 42 to enclose the slip ring. Each of the cooling fins 511 and 512 has an inside edge and an outside edge. Each inside edge is spaced apart from the slip ring protector 91 and each outside edge is spaced apart from the rear cover 92.

The brush holder 6 is comprised of the brush case 62 for accommodating the brushes 61 and a pair of brush case arms 63. The brush case arms 63 are respectively fixed to the cooling fins 511 and 512 so as to be disposed inside the cutout section 52 of the pair of cooling fins 511 and 512. The circumferential width E of the brush case is determined according to the size of the brushes that is not only necessary to conduct a suitable amount of field current and but also necessary to provide a suitable life time to survive the abrasion thereof.

The connector case 8 includes the terminal 81 and a pair of fastening arms 82 for supplying electric power to the IC regulator 7 and fastening the connector case 8 to the pair of cooling fins 511 and 512, which are molded together. A noise suppressing capacitor 85 is disposed at the front side of the connector case 8. The capacitor 85 has terminals 851 connected to the fastening arms 82. The pair of fastening arms 82 is made of a metal member and is respectively fastened to the positive and the negative cooling fins 511 and 512 by bolts or the like, so that the connector case 8 is disposed inside the cutout section 52 of the cooling fins 511 and 512.

The IC regulator 7 includes a plurality of terminals 71, an IC chip (not shown) and a heat sink 73, which are molded together into a flat. The heat sink 73 has a plurality of fins at the rear side thereof. The connector case 8 has a rear surface facing the rear cover 92, and the surface of the heat sink 73 is disposed on the rear surface of the connector 8 to be in parallel with the inside bottom surface of the rear cover 92. A cooling air passage 90 is formed between the bottom or radially inside surface of the connector 8 and radially outside surface of the brush holder 6. The plurality of terminals 71 extends from the mold portion to be soldered to related parts in a well-known manner.

Figure 4:
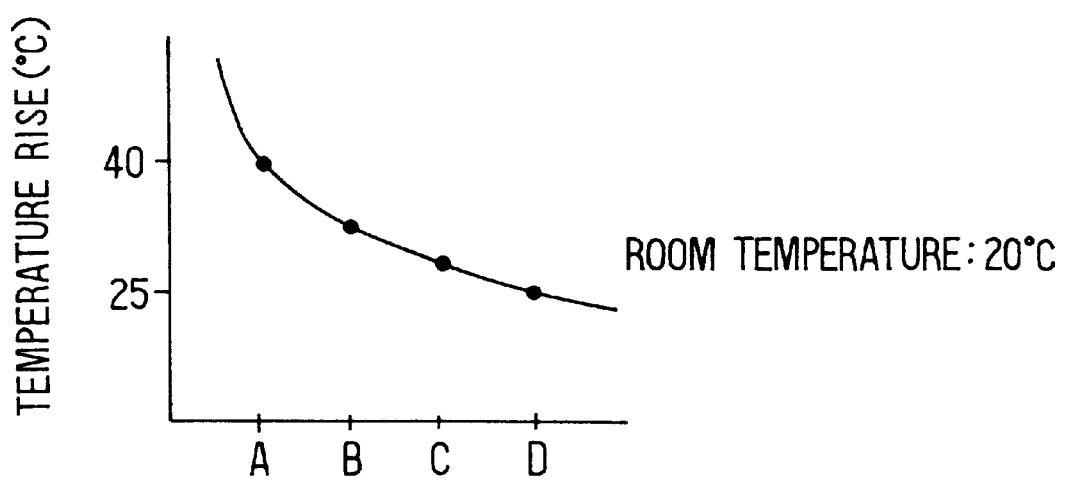
FIG. 4 is a graph showing a characteristic curve of temperature at portions around the regulator of the vehicle AC generator illustrated in FIG. 3.

As shown in FIG. 4, temperature at portions B, C and D, which are located opposite an air-intake window of the rear cover 92, is lower than the temperature of the portion A which is located between the brush holder 6 and the connector 8. When the IC regulator 7 operates, the level of the heat radiation from the cooling fins of the diodes and the brushes is smaller at the portions of the connector case 8 that face the rear cover 92 than the level at the portion between the brush holder 6 and the connector 8. The level is also smaller at a portion of the brush holder near the connector case 8 that faces the rear cover 92.

Because the IC regulator 7 is disposed between the connector case 8 and the rear cover 92, the heat radiation from the cooling fins 511 and 512 and the heat radiation from the brush holder 6 is interrupted by the connector case 8 and lessened. In addition, the cooling air passage 90 for the air after cooling the IC regulator 7 is provided between the connector case 8 and the brush holder 6, thereby to control the temperature rise of the IC regulator 7.

As shown in FIG. 1, cooling air is taken in from an air intake window formed at the bottom of the rear cover 92 that faces the IC regulator 7 and flows along the surface of the IC regulator 7 and conducted to the cooling air passage 90.

Figure 5:
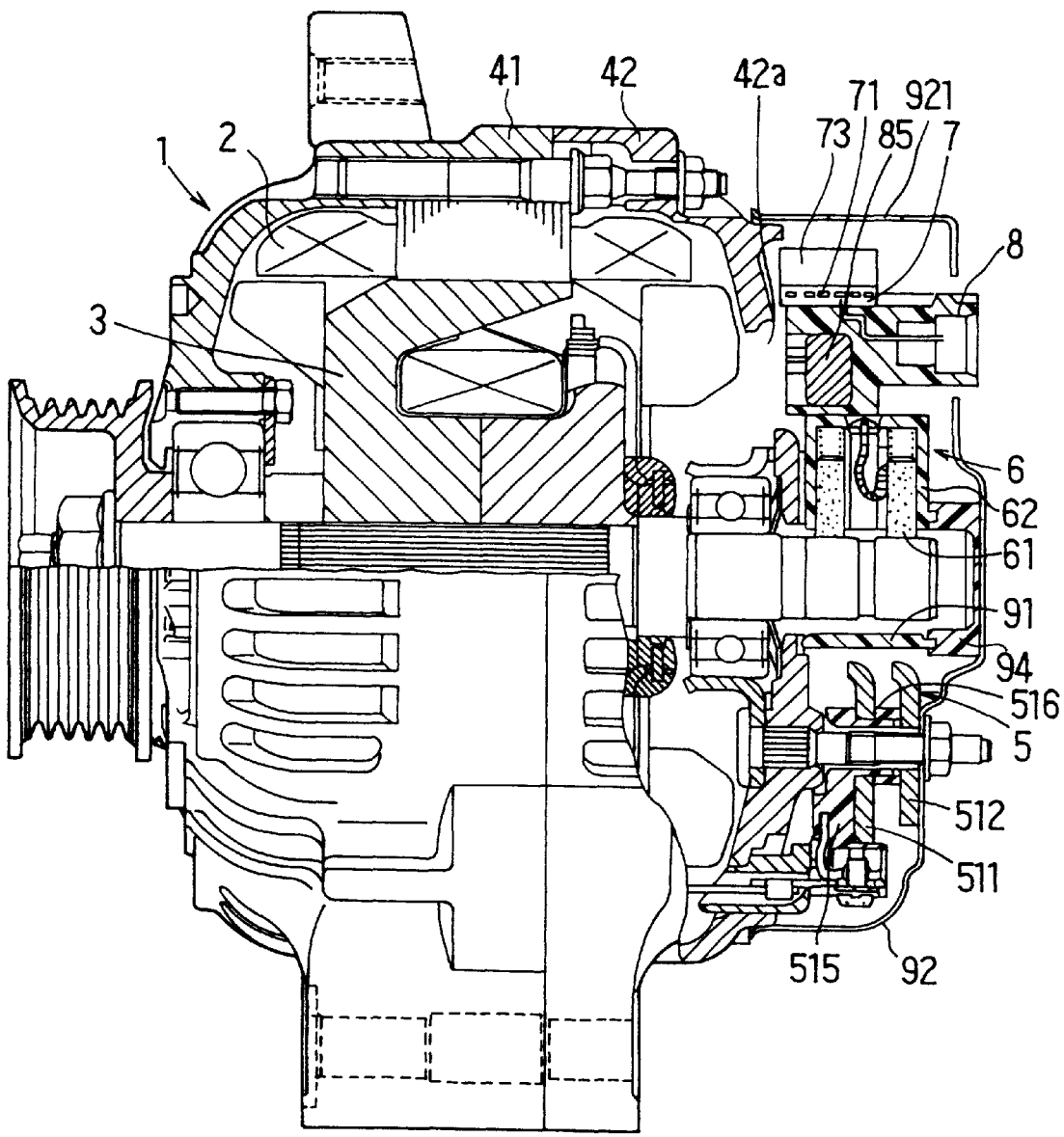
FIG. 5 is a cross-sectional side view of a vehicle AC generator according to a second embodiment of the invention.

Another vehicle AC generator according to a second embodiment of the invention is shown in FIG. 5. In the meantime, the same reference numeral represents the same or substantially the same parts or portion.

The IC regulator 7 can be disposed at radially more outside surface of the connector case that faces the side of rear cover, as shown in FIG. 5. The rear cover 92 may have an air intake window 921 at a portion opposite the IC regulator 7 to provide cooling air flowing along the surface of the IC regulator 7 toward an air intake window 42a of the rear frame 42, thereby cooling the IC regulator 7.

Instead of the heat sink 73 having a plurality of the fins, a simple metal heat-dissipation plate can be formed on the portion on which cooling air blows if the heat radiation can be controlled to lower the ambient temperature of the IC regulator 7.

The brush holder 6 of the above embodiments, which is fixed to the cooling fins 511 and 512, can be fixed to the connector case 8 or the rear frame 42 if the brush case 62 is supported at a fixed position.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator comprising:
   a rotor having a field coil and a cooling fan;
   a stator having an armature coil;
   a frame for supporting said rotor and stator, said frame having an air intake window for introducing air to said cooling fan;
   a rear cover fixed to said frame to provide an enclosure between said frame and said rear cover, said rear cover having an air intake window opposite said opening of said frame;
   a pair of C-shaped positive and negative cooling fins having a common cutout section at a half side of said enclosure thereby forming an accommodation space in said enclosure, said cooling fins being fixed to said frame to overlap each other in an axial direction;
   a plurality of positive and negative rectifier elements respectively fixed to said pair of positive and negative cooling fins at the other half side thereof;

a pair of brushes for supplying field current to said rotor;

a brush-holder, disposed in said accommodation space, for holding said pair of brushes, said brush-holder having a radially outside surface disposed behind said positive and negative rectifier elements to intersect said cutout section;

a connector case having radially outside surface disposed in said accommodation space to intersect said cutout section at a portion radially outside said brush holder so as to form a cooling air passage directly connecting said air intake window of said rear cover and said cooling fan, said connector case having a terminal for transmitting and receiving electric signals; and an IC regulator, disposed in said cooling air passage around said connector case to face said rear cover, for controlling output voltage of said armature coil, said IC regulator having a heatsink disposed in said cooling air passage opposite said air intake window of said rear cover.

2. The AC generator as claimed in claim 1, wherein said IC regulator is disposed between said connector case and said rear cover.

3. The AC generator as claimed in claim 1, wherein said IC regulator is disposed between said brush holder and said rear cover.

4. The AC generator as claimed in claim 1, wherein said heatsink of said IC regulator is disposed closer to said rear cover than said cutout section.

5. The AC generator as claimed in claim 1, wherein said heatsink of said IC regulator is disposed radially outside said connector case.

6. The AC generator as claimed in claim 1, wherein said cutout section includes an axial passage for conducting cooling air that has passed the outside surface of said IC regulator.

7. The AC generator as claimed in claim 1, wherein said heat sink has a plurality of projections forming parallel air passages extending in a radial direction along said air passage.

8. The AC generator as claimed in claim 1, wherein said brush holder is fastened to at least one of said connector case, said cooling fins and said frame so that said brush holder can be fixed at a present position.

9. The AC generator as claimed in claim 1, further comprising:

a noise suppressing capacitor disposed in said cutout section.

10. The AC generator as claimed in claim 1, wherein said IC regulator comprises a one chip IC that includes a power transistor for controlling said field current.

11. A vehicle AC generator, comprising:

a rotor having a field coil and a pair of slip rings connected to said field coil;

a stator having an armature coil;

a frame for supporting said rotor and stator;

a rear cover fixed to said frame, said rear cover having an air intake window;

a rectifying unit including a pair of positive and negative cooling fins and a plurality of positive and negative rectifier elements respectively fixed to said pair of positive and negative cooling fins, said pair of cooling fins having a common cutout section at the middle thereof thereby forming an accommodation space between said frame and said rear cover;

a brush unit including a pair of brushes in contact with said pair of slip rings and a brush-holder for holding said pair of brushes, said brush holder being disposed in said accommodation space so that a radially outside surface of said brush-holder intersects said cutout section;

a connector case disposed in said accommodation space on a side of said brush holder behind said rectifier elements so that a radially inside surface of said case intersects said cutout section so as to form a cooling air passage connecting to said air intake window along said connector case, said connector case having a terminal for transmitting and receiving electric signals; and an IC regulator, disposed in said cooling air passage around said connector case to face said rear cover, for controlling output voltage of said armature coil, said IC regulator having a heatsink disposed opposite said air intake window of said rear cover.

12. A vehicle AC generator, comprising:

a rotor having a field coil and a pair of slip rings connected to said field coil;

a stator having an armature coil;

a frame for supporting said rotor and stator;

a rear cover fixed to said frame, said rear cover having an air intake window;

a rectifying unit including a pair of positive and negative cooling fins and a plurality of positive and negative rectifier elements respectively fixed to said pair of positive and negative cooling fins, said pair of cooling fins having a common cutout section at the middle thereof thereby forming an accommodation space between said frame and said rear cover;

a brush unit including a pair of brushes in contact with said pair of slip rings and a brush-holder for holding said pair of brushes, said brush holder being disposed in said accommodation space so that a radially outside surface of said holder intersects said cutout section;

a connector case disposed in said accommodation space on a side of said brush holder behind said rectifier elements so that a radially inside surface of said case intersects said cutout section, said connector case having a terminal for transmitting and receiving electric signals; and an IC regulator having a heat sink for controlling output voltage of said armature coil; wherein said connector case is disposed in said accommodation space so as to form a cooling air passage connecting to said air intake window along said connector case;

said IC regulator is disposed in said cooling air passage around said connector case to face said rear cover; and said heat sink is disposed in said cooling air passage opposite said air intake window of said rear cover.

13. A vehicle AC generator, comprising:

a rotor having a cooling fan;

a stator;

a frame for supporting said rotor and stator;

a rear cover disposed at a rear end of said frame, said rear cover having an air intake window;

a pair of C-shaped cooling fins having a common cutout section at the middle thereof disposed between said frame and said rear cover, thereby forming an accommodation space between said frame and said rear cover;

a plurality of rectifier elements respectively fixed to said pair of cooling fins;

a brush unit disposed in said accommodation space so that a radially outside surface of said unit intersects said cutout section;

a connector case disposed in said accommodation space at a side of said brush unit behind said rectifier elements so that a radially inside surface of said case intersects said cutout section thereby forming a cooling air passage connecting said air intake window and said cooling fan; and an IC regulator having a heat sink disposed in said cooling air passage.

* * * * *